United States Patent
Wojcik et al.

(10) Patent No.: US 11,650,072 B2
(45) Date of Patent: May 16, 2023

(54) PORTABLE LANE DEPARTURE DETECTION

(71) Applicant: International Business Machines Corporation, Armonk, NY (US)

(72) Inventors: Marci Ramona Wojcik, Grand Blanc, MI (US); Larisa Shwartz, Greenwich, CT (US); Dirk Schaepers, Frankfurt (DE); Manickam Alagappan, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 16/695,433

(22) Filed: Nov. 26, 2019

(65) Prior Publication Data
US 2021/0156708 A1   May 27, 2021

(51) Int. Cl.
  *G08G 1/16*   (2006.01)
  *G01C 21/36*   (2006.01)
  *G01C 21/34*   (2006.01)
  *B60W 30/095*   (2012.01)
  *B60W 50/14*   (2020.01)

(52) U.S. Cl.
  CPC ..... *G01C 21/3676* (2013.01); *B60W 30/0956* (2013.01); *B60W 50/14* (2013.01); *G01C 21/3492* (2013.01); *G01C 21/3632* (2013.01); *G08G 1/166* (2013.01); *B60W 2554/00* (2020.02)

(58) Field of Classification Search
  CPC ............ G01C 21/3676; G01C 21/3492; G01C 21/3632; B60W 30/0956; B60W 50/14; B60W 2554/00; G08G 1/166; B60K 2370/11; B60K 2370/152
  See application file for complete search history.

(56) References Cited

U.S. PATENT DOCUMENTS

| 9,916,755 B1 | 3/2018 | Ratti |
| 10,315,566 B2 | 6/2019 | Choi |

(Continued)

FOREIGN PATENT DOCUMENTS

| CN | 107145578 A | 9/2017 |
| CN | 108803617 A | 11/2018 |

OTHER PUBLICATIONS

"Solving problems using trigonometry—slant distance", Math Open Reference, (C) 2011 Copyright Math Open Reference, 3 pages, <https://www.mathopenref.com/trigprobslant.html>.

*Primary Examiner* — Abby Y Lin
*Assistant Examiner* — Renee LaRose
(74) *Attorney, Agent, or Firm* — Brian M. Restauro

(57) ABSTRACT

Embodiments of the present invention provide computer-implemented methods, computer program products and systems. Embodiments of the present invention can receive position and location information. Embodiments of the present invention can generate a risk score for one or more maneuvers associated with a predicted trajectory of a vehicle. Embodiments of the present invention can generate a visual representation for each of the one or more maneuvers associated with the predicted trajectory of the vehicle based on the generated risk score associated with each maneuver. Embodiments of the present invention can integrate the generated visual representation into a user display.

20 Claims, 7 Drawing Sheets

(56) References Cited

U.S. PATENT DOCUMENTS

| | | | |
|---|---|---|---|
| 10,322,696 B2 | 6/2019 | Gao | |
| 10,832,449 B1* | 11/2020 | Russo | G01C 21/3626 |
| 2018/0023961 A1 | 1/2018 | Fridman | |
| 2018/0137373 A1* | 5/2018 | Rasmusson, Jr. | G06V 20/56 |
| 2019/0003849 A1* | 1/2019 | Pahwa | G01C 21/362 |
| 2021/0004011 A1* | 1/2021 | Oh | G06K 9/6273 |
| 2021/0027620 A1* | 1/2021 | Luk-Zilberman | G06T 7/246 |
| 2021/0063178 A1* | 3/2021 | Modi | G01C 21/3415 |

* cited by examiner

PORTABLE LANE DEPARTURE DETECTION

BACKGROUND

The present invention relates generally to the navigation systems, and more particularly to lane departure and permissioned, crowdsourced navigation.

In general, navigation systems can determine the position of a user from radio signals of satellites. Typically, navigation systems receive radio signals, calculate a user's position, and route a user to an intended destination. In some instances, navigation systems have features that allow a user to sort route preferences by shortest route and fastest route. In other instances, navigation systems have features to avoid certain locations (e.g., toll roads).

A lane departure warning system is typically referred to as a mechanism designed to warn a driver when the vehicle begins to move out of its lane (unless a turn signal is on in that direction) on freeways and arterial roads. These systems are designed to minimize accidents. Warnings can include visual, audible or vibration warnings. In some cases, systems can assist in oversteering to keep the car centered in the lane.

SUMMARY

Embodiments of the present invention provide computer-implemented methods, computer program products and systems. In one embodiment of the present invention, a computer-implemented method is provided comprising: receiving position and location information; generating a risk score for one or more maneuvers associated with a predicted trajectory of a vehicle; generating a visual representation for each of the one or more maneuvers associated with the predicted trajectory of the vehicle based on the generated risk score associated with each maneuver; and integrating the generated visual representation into a user display.

DETAILED DESCRIPTION

Figure 1:
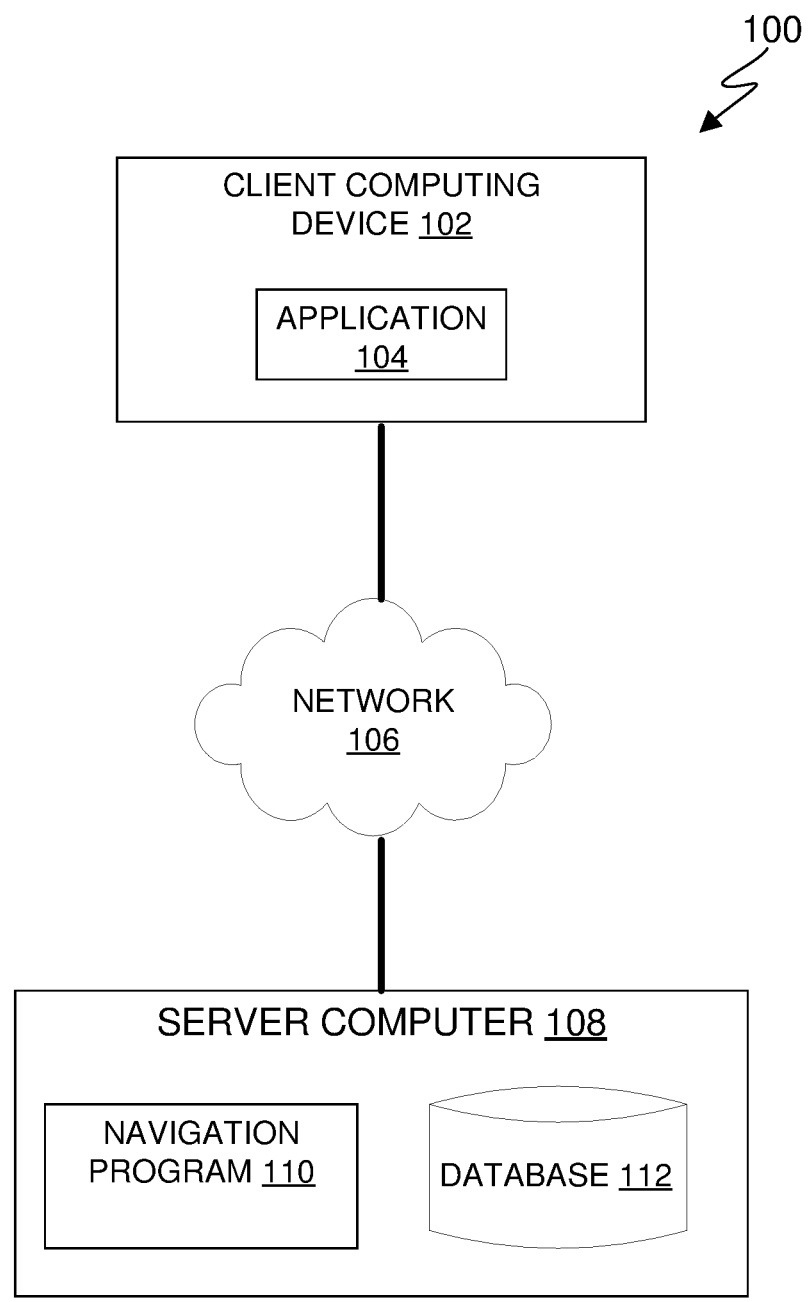
FIG. 1 is a functional block diagram illustrating a computing environment, in accordance with an embodiment of the present invention.

Embodiments of the present invention recognize deficiencies of navigation systems. Specifically, embodiments of the present invention recognize that traditional navigation systems typically lack lane departure visualization and alerts. Typically, navigation systems and lane departure systems do not communicate with each other and are typically run as two separate entities. Embodiments of the present invention provide solutions that integrate navigation systems with lane departure features in a cost effective, portable manner. Specifically, embodiments of the present invention can be used to generate a risk score for a potential lane change and overlay a visual representation of the potential risk associated with the potential lane change in a user navigation interface based, at least in part on crowdsourced navigation information, and location information of a user as discussed in greater detail later in this Specification.

Other embodiments of the present invention enable communication between navigation systems and lane departure technology. For example, embodiments of the present invention can leverage existing navigation system services (e.g., web-based applications) with location information collected from a user device to display a lane departure warning. Embodiments of the present invention can further improve existing navigation systems by generating a user interface that can overlay a lane departure warning onto an existing navigation display based on sensor information collected from a user's mobile device as discussed in greater detail below.

As used herein, "location information" refers to information about a location and changes to information pertaining to navigation to and from the location. For example, location information can refer to position information of a user. Position information refers to directional information or changes in directional information that includes a user's location. Positional information can also include information surrounding an area of the user. Location information can further include a user's current speed, mode of transportation, traffic information in the vicinity of the user (e.g., immediate real time traffic information), position information of other vehicles within a radius of the user, etc.

Location information can also include information associated with a physical location of a structure. For example, location information can include hours of operation of a building, road closures, anticipated traffic based on scheduled events such as concerts, real-time traffic, queue status of locations such as restaurant wait times, user preferences, etc.) Often times, push notifications are presented at the moment the notification containing relevant location information becomes available. In other circumstances, push notifications are presented at predetermined intervals and presented regardless of availability or convenience for a user.

Embodiments of the present invention provide mechanisms for a user to opt-in and opt-out of data collection events (e.g., user information) and can, in some instances, transmit a notification that user information is being collected or otherwise being accessed and used. As used herein "user information" refers to information associated with a user and can be found in a user's profile, user preferences, display settings, device information, etc.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 5.

Client computing device 102 is a digital device associated with a user and includes application 104. Application 104 communicates with server computer 108 to access navigation program 110 (e.g., using TCP/IP) to access user information. Application 104 can further communicate with navigation program 110 to transmit instructions to predict vehicle trajectory and generate a risk score associated each maneuver (e.g., a move) along the predicted trajectory. Application 104 can further communicate with navigation program 110 to generate a visual representation of the generated risk score and one or more notification options that can be overlaid on top of a navigation system display in use as discussed in greater detail with regards to FIGS. 3-6. In some embodiments, application 104 can transmit user information (e.g., text-based, video-based, audio-based, image-based information). In other embodiments, application 104 can transmit user preferences to navigation program 110. In general, application 104 can be implemented using a browser and web portal or any program that can interface with or otherwise access navigation program 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts navigation program 110 and database 112. In this embodiment, database 112 functions as a repository for stored content. Database 112 can reside on a cloud infrastructure and stores user generated information. In some embodiments, database 112 can function as a repository for one or more files containing user information. Database 112 can further store current crowdsourced navigation information (e.g., current traffic event data), GPS indexed historic crowdsourced traffic event data, GPS, indexed historical weather data, GPS indexed historical traffic event data, and current GPS location services data). In this embodiment, database 112 is stored on server computer 108 however, database 112 can be stored on a combination of other computing devices (not shown) and/or one or more components of computing environment 100 (e.g., client computing device 102) and/or other databases that has given permission access to navigation program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

In this embodiment, navigation program 110 resides on server computer 108. In other embodiments, navigation program 110 can have an instance of the program (not shown) stored locally on client computer device 102. In yet other embodiments, navigation program 110 can be stored on any number or computing devices (e.g., a smart device).

Navigation program 110 provides navigation services that integrate navigation services with lane departure warnings. In this embodiment, navigation program 110 integrates navigation services by predicting a vehicle's trajectory, generating a risk score for a vehicle movement (e.g., vehicle maneuver) to be performed by the vehicle, generating a visual representation of the generated risk score, and integrating the generated visual representation into a user display.

In this embodiment, navigation program 110 can utilize sensors that collect current position information, navigation information, speed, and one or more images. Sensors (not shown) can include camera and audio sensors of one or more user devices (e.g., user smart devices) that navigation program 110 has been given permission to access. In this embodiment, navigation program 110 utilizes sensors that collect current position and navigation information by transmitting instructions to devices that include those one or more sensors to collect and transmit the collected information to navigation program 110 as discussed in greater detail with regard to FIGS. 3-6. Navigation program 110 can then upload current collected images to a permissioned crowdsourced stream integration of data sources.

Navigation program 110 can utilize the collected information to perform proximity triangulation between location services calculation of road condition, lanes, width, and curvature in conjunction with a user device (e.g., user smart devices such as client computing device 102). In this embodiment, navigation program 110 utilizes a standard width as a basis for an approximation of a maximum deviation from the center of a lane (X,Y) coordinates that the vehicle can safely approach.

Navigation program 110 can further utilize the collected information to calculate object distance based on positioning of the sensors. For example, navigation program 110 can transmit instructions to a user of a device containing sensors (e.g., a smart phone) for placement of the device. Navigation program 110 can then calculate a distance of an object (relative to the device) based on an angle the device (relative to the object) and the height of the device as positioned in the vehicle (relative to the object) as discussed in greater with respect to FIG. 5.

In this embodiment, navigation program 110 utilizes Generative Adversarial Networks (GAN) to predict car trajectory based on image information collected from one or more sensors. Navigation program 110 can utilize a generative score model (not shown) that generates (e.g., creates) images depicture future locations of a vehicle and a discriminative classifier module (also not shown) to validate the generated image based on the prediction. For example, navigation program 110 can receive an image of a relative location of a vehicle (e.g., the collected position information and navigation information obtained from the one or more sensors) and predict a future vehicle location at a future time, expressed in a number of milliseconds. In this embodiment, navigation program 110 calculates the future position of a vehicle based on how quickly an identified vehicle changes position relative to identified background objects in a group of collected images changes depicting the vehicle. In this embodiment, navigation program 110 utilizes two neural network models: one that generates new images (e.g., a vehicles position relative to a location) and another that validates the generated image produced by navigation program 110. Embodiments of the present invention recognize that adversarial networks used in aging of objects and/or people can produce desired results.

Navigation program 110 can then create a visual representation of movements associated with a level of risk to be overlaid over an existing navigation display. For example, navigation program 110 can create images of predicted locations of two vehicles. For example, a first vehicle can be designated as a vehicle using navigation program 110. Navigation program 110 can predict that a maneuver a user of the first vehicle reaches or exceeds a threshold level for safety (e.g., that the maneuver is predicted as unsafe and could lead to an accident). Navigation program 110 can then generate images of the predicted position and trajectory of the second vehicle in relation to the predicted position and trajectory of the first vehicle. Navigation program 110 can then display the generated images in a user interface of the user device (e.g., client computing device 102).

In this embodiment, navigation program 110 uses a numerical confidence threshold scale where lesser numbers indicate a lower confidence while greater numbers indicate a higher confidence value (e.g., 90% confidence value shows a higher confidence value where a 10% confidence value indicates a lower confidence). In other embodiments, any other scale can be used. In this embodiment, navigation program 110 establishes a threshold value of fifty percent as the threshold level for safety, that is, a confidence value of greater than or equal to fifty percent triggers an action by navigation program 110.

In instances where navigation program 110 is integrated with an existing navigation service, navigation program 110 can access information from a navigation service and replicate and/or otherwise access the navigation information depicted by the navigation service. In other words, navigation program 110 can replicate the real time map of location information of the user as generated by an existing navigation service. As used herein, "navigation information", can include location information and directional information of the user. For example, navigation information can include current position of the user, navigational directions given to a user, a route requested by the user to a location, real time traffic information, information associated with a position of the user which can further include number of lanes of a roadway, direction information associated with the roadway. Navigation information can also include posted speed limits, cardinal direction of the user, distances to a location, etc.

In this embodiment, navigation program 110 can integrate the generated visual representations by generating a user interface display that can be overlaid over an existing navigation display (e.g., via enabling a dual display mode). For example, navigation program 110 can predict a vehicle maneuver (e.g., a lane change) for a first vehicle, would result in an accident because a second vehicle is moving at a faster speed in the lane that the first vehicle would maneuver into. In instances, where a navigation display of an existing navigation service is enabled for the first vehicle, navigation program 110 can generate a visual representation of the risk associated with the maneuver (e.g., the lane change) that is overlaid in the navigation display the user is currently using (e.g. navigation program 110 can generate a display for a navigation service application that the user is using that is overlaid over the existing display).

The generated display can illustrate the move a user of the first vehicle wants to perform and the associated risk. The associated risk can be depicted as an image of the predicted position of the second vehicle. In other embodiments, the associated risk may only show the predicted image of the first vehicle with a graphic of a warning sign. The warning sign can include an interactive toggle that displays the corresponding risk associated with the maneuver. In other embodiments, the warning sing and display can be audible (e.g., the warning may be a speech discernable warning or a warning tone).

Navigation program 110 can further generate one or more display icons as part of the generated display (e.g., generated user interface) for one or more databases that contains GPS indexed historical traffic event data, historical weather data, and indexed crowdsourced traffic event data. These one or more display icons can also trigger a different set of layers to be overlaid over existing navigation services.

Navigation program 110 can add a voice active slider bar in addition to the generated one or more display icons. For example, in response to a user selected the voice active slider bar, navigation program 110 can establish a view on the user interface that gives the user an ability to "look ahead" distance to be displayed in a dual view (e.g., allows the user to view one or more generated images of predicted locations of vehicles while allowing a navigation display showing route guidance to be viewed at the same time).

Accordingly, by activating or otherwise enabling the dual display mode, navigation program 110 can display route guidance as well as the generated images based on predictions made by navigation program 110 to allow a user to view near and long range road and weather conditions as they occur. For example, navigation program 110 can display one or more created images of future weather conditions along a user's route at a pre-defined distance (i.e., navigation program 110 can display images of what future weather conditions can be ten miles from the vehicle's current location).

Similarly, navigation program 110 can also generate predicted, future locations of one or more vehicles and display future positions (locations) of vehicles relative to a predicted location of the user (i.e., navigation program 110 can generate an image of where vehicle 2 will be in relation to a future location of where vehicle 1 will be). Navigation program 110 can generate these images based on merging and combining data from one or more sensors feeding it information (e.g., one or more cameras of user devices, vehicle cameras, edge services, and permissioned crowdsourced open data streams etc.).

In another embodiment, in response to a user selecting a display icon, navigation program 110 can access the database and recalculate a navigation route based on the information accessed in the database. For example, in response to a user selecting a display icon that links to GPS indexed historical traffic event data, navigation program 110 can recalculate an existing navigation route based on the GPS indexed historical traffic event data. In other embodiments, navigation program 110 can automatically access information linked in the databases and either calculate a new route or recalculate an existing route based on information accessed in one or more databases (e.g., information that depicts GPS indexed historical traffic event data, historical weather data, and indexed crowdsourced traffic event data).

Figure 2:
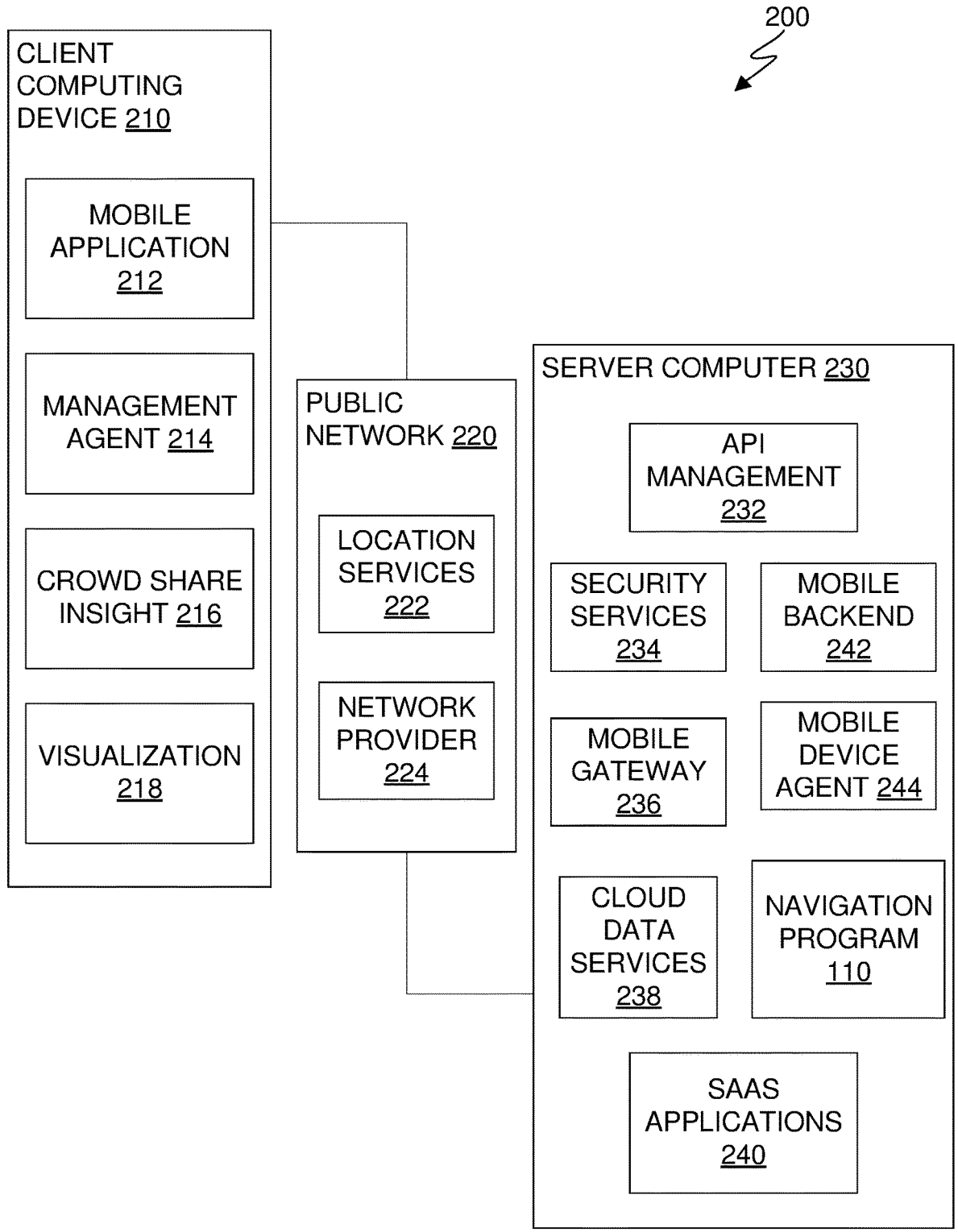
FIG. 2 is a functional block diagram illustrating another computing environment, in accordance with an embodiment of the present invention.

FIG. 2 is a functional block diagram, designated as computing environment 200 illustrating another computing environment, in accordance with an embodiment of the present invention.

FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. For example, although client computing device 210, public network 220, and server computer 230 are depicted as separate entities however, in some embodiments, these separate computing components can reside on a single computing device.

FIG. 2 depicts client computing device 210 and server computer 230 connected over public network 220. In this embodiment, client computing device 210, server computer 230, and public network 220 have the same capabilities of client computing device 102 and server computer 108 and network 106 as described in FIG. 1 however, in this embodiment, client computing device 210, server computer 230 and public network 220 each respectively contain one or more different modules that can be used or otherwise access by navigation program 110.

In this embodiment, client computing device 210 includes mobile application 212, management agent 214, crowd share insight 216, and visualization 218. In general mobile application 212 can refer to an application or program that can communicate with navigation program 110 or one or more other components of computing environment 200.

Management agent 214 facilitates communication between one or more components of client computing device 210. For example, management agent 214 can facilitate sharing of information contained in client computing device 210 with one or more other components of client computing device 210.

Crowd share insight 216 can function as a repository for determined insights (e.g., one or more databases containing trends associated with historic crowdsourced traffic event data, historical weather data, historical traffic event data, and current GPS location services data) from one or more navigation based crowd sharing platforms. In other embodiments, crowd share insight 216 can store determined insights from one or more other predictive analytics model and artificial intelligence algorithms.

Visualization 218 (also referred to as a visualization module) refers to one or more visualization applications capable of creating one or more images (e.g., generated images of predicted positions of one or more vehicles). In other embodiments, visualization 218 can also be used to create user interface displays that can be overlaid over an existing navigation display. For example, visualization 218 can be used by navigation program 110 to create a user interface display that displays interactive icons that, when selected, can link to or otherwise access determined crowd shared insights.

Public network 220, like network 106 can be, for example, a telecommunications network, a local area network (LAN), a wide area network (WAN), such as the Internet, or a combination of the three, and can include wired, wireless, or fiber optic connections. Public network 220 can include one or more wired and/or wireless networks that are capable of receiving and transmitting data, voice, and/or video signals, including multimedia signals that include voice, data, and video information. In general, public network 220 can be any combination of connections and protocols that will support communications among client computing device 210 and server computer 230, and other computing devices (not shown) within computing environment 200.

In this embodiment, public network 220 includes location services 222 and network provider 224. In general, location services 222 refers to an infrastructure that enables one or more mobile devices (e.g., client computing device 210) to identify a current physical location and can be used in combination with GPS, cellular systems, along with Wi-Fi hotspots to pinpoint a longitude and latitude of a user of a mobile device. Network provider 224 can general refer to a communications service (e.g., a data carriers, wireless communication providers, internet services providers, high-speed internet access) and can be used by client computing device 210 to communicate with server computer 230 and any other components thereof.

Sever computer 230 like server computer 108 can be a standalone computer device, a management server, a webserver, a mobile computing device, or any other electronic device or computing system capable of receiving, sending, and processing data. In some embodiments, server computer 230 can be hosted on a cloud infrastructure platform.

Server computer 230 includes API management 232, security services 234, mobile gateway 236, cloud data services, 238, SaaS applications 240, mobile backend 242, mobile device agent 244, and navigation program 110. API management 232 refers to a service that creates and publishes web application programming interfaces, enforces usage policies, controls access, monitors community membership, and collects and analyzes usage statistics and performance.

Security services 234 refers to an application or application suite providing cybersecurity of information. Security services 234 can include one or more communication and authentication protocols.

Mobile gateway 236 generally refers to one or more software or hardware appliance components that provides secure communication between a mobile application and respective backend resources (e.g., mobile backend 242) typically within a network. Mobile backend 242 provides a mechanism (e.g., via API management 232) for web applications and mobile applications (e.g., mobile application 212) to be linked to a backend cloud storage and APIs exposed by backend applications. Mobile backend 242 can further provide features such as user management, push notifications, and integration with social networking service.

Cloud data services 238 refers to one or more services over the Internet or dedicated network (e.g., public network 220), with delivery of services on demand. Cloud computing services range from full applications and development platforms, to servers, storage, and virtual desktops.

SaaS application 240 is a type of cloud data service and generally refers to one or more software or application licensing delivery model on a subscription bases and is centrally hosted on server computer 230.

Mobile device agent 244 refers to an application that enables information to be synchronized between one or more devices (e.g., between client computing device 210 and another computing device of a user, not shown). Mobile device agent 244 can be any number of on-device applications, configurations, policies, certificates, and backend infrastructure that is used to enhance management of end user devices.

Navigation program 110 provides navigation services that integrate navigation services with lane departure warnings. In this embodiment, navigation program 110 integrates navigation services by predicting a vehicle's trajectory, generating a risk score for a vehicle movement (e.g., vehicle maneuver) to be performed by the vehicle, generating a visual representation of the generated risk score, and integrating the generated visual representation into a user display as previously discussed in FIG. 1.

Figure 3:
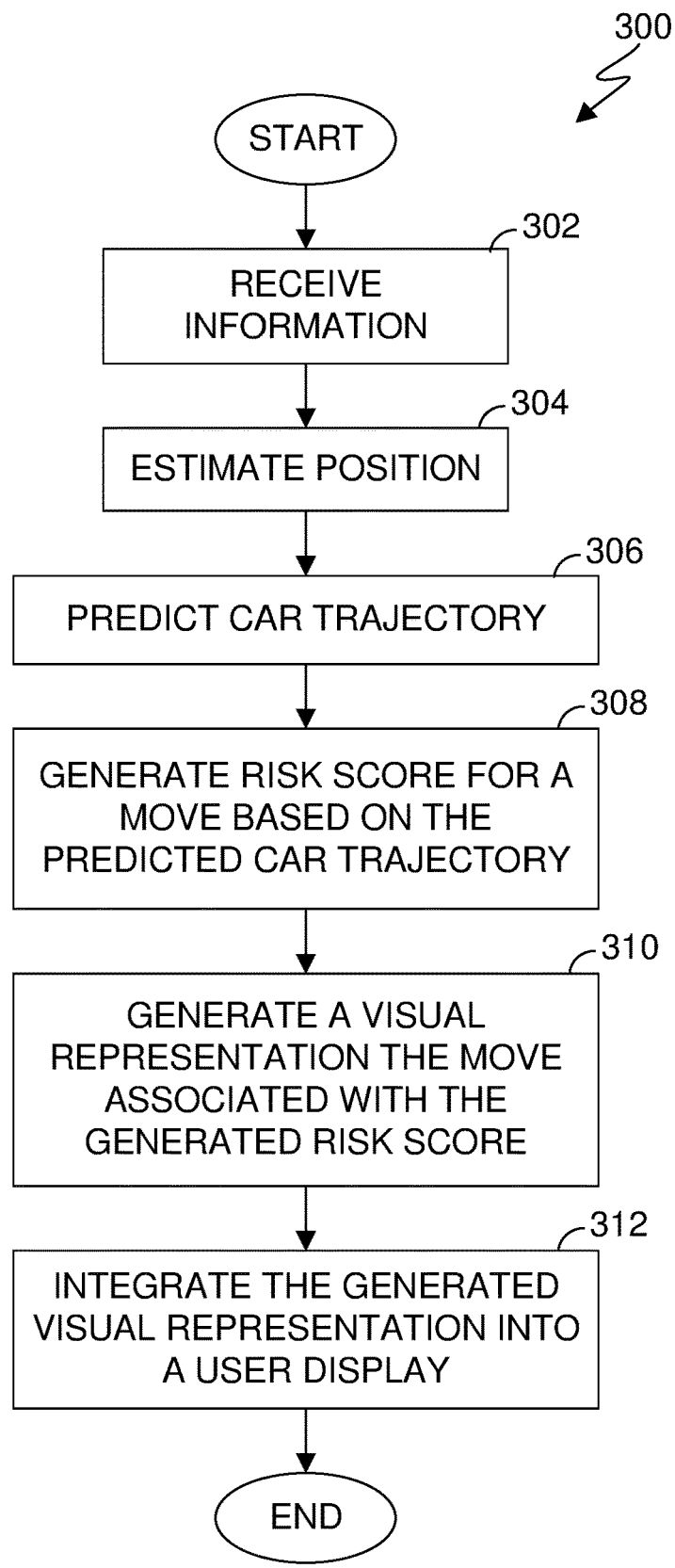
FIG. 3 is a flowchart depicting operational steps for integrating a lane departure warning, in accordance with an embodiment of the present invention.

FIG. 3 is a flowchart 300 depicting operational steps for integrating a lane departure warning, in accordance with an embodiment of the present invention.

In step 302, navigation program 110 receives information. In this embodiment, navigation program 110 receives information by transmitting a request to client computing device 102 for information. Information received by navigation program 110 generally refers to one or more user information that refers to details associated with a user and can be found in a user's profile, user preferences (routines, predefined responses to events, and other constraints), e-mail, to-do list, calendar, messaging services, and in certain circumstances, the user's social media, position information (e.g., directional information or changes in directional information that includes a user's location along with information surround an area) of a user, and any navigation information (e.g., route guidance, crowdsourced traffic event data, weather data, etc.). Navigation program 110 can receive positioning information of a user by transmitting instructions to sensors (e.g., accelerometer and corresponding GPS modules) embedded in client computing device 102.

In certain embodiments, navigation program 110 can be given permission access by a user to access user information directly from client computing device 102 at regular, predefined intervals. In other embodiments, user information can be sent from client computing device 102 to navigation program 110 at regular intervals. In circumstances where user information resides on multiple sources (e.g., multiple computing devices), navigation program 110 can invoke a merger module (not shown) to combine and de-duplicate duplicative user information.

In step 304, navigation program 110 estimates a position of a vehicle associated with the user. In this embodiment, navigation program 110 estimates a position of a vehicle based on the received information. For example, navigation program 110 can receive GPS coordinates of a user device (e.g., client computing device 102). Navigation program 110 can then combine the received GPS coordinates with received images from one or more other devices (e.g., client computing device 102, vehicle sensors, etc.) and determine that the vehicle position is in the second lane of a four lane highway.

Figure 4:
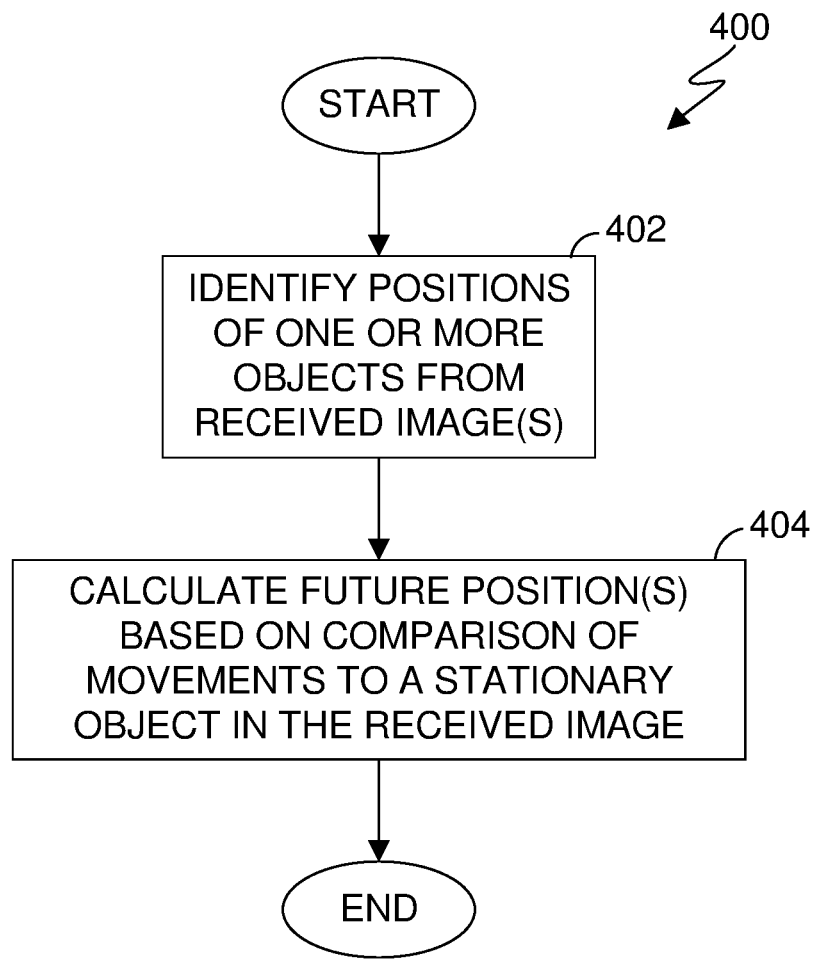
FIG. 4 is a flowchart depicting operational steps for predicting a lane departure, in accordance with an embodiment of the present invention.

In step 306, navigation program 110 predicts a car's trajectory, by identifying positions from one or more received images, and calculating future positions based on a comparison of movements to a stationary object in respective images of the one or more images as discussed in greater detail with regards to FIG. 4. For example, navigation program 110 calculates the future position of a vehicle based on how quickly an identified vehicle changes position relative to identified background objects in a group of collected images changes depicting the vehicle.

In step 308, navigation program 110 generates a risk score for a move (e.g., maneuver) of the vehicle based on the predicted car trajectory. In this embodiment, navigation program 110 generates a risk for a move of the vehicle by utilizing a risk prediction algorithm that assigns weight values to one or more risks associated with a respective movement of a vehicle based on predicted movements of one or more objects (e.g., vehicles) surrounding the vehicle. Navigation program 110 can then add weight values for each risk associated with the movement and determine a total risk score for the movement. In another embodiment, navigation program 110 generate a risk score for a move by assigning a confidence value for the move utilizing a combination of one or more predictive analytics, and artificial intelligence algorithms.

In step 310, navigation program 110 generates a visual representation of the move associated with the generated risk score. In this embodiment, navigation program 110 generates a visual representation of the move by creating images of predicted locations of one or more vehicles. For example, a first vehicle can be designated as a vehicle using navigation program 110. Navigation program 110 can predict that a maneuver a user of the first vehicle reaches or exceeds a threshold level for safety (e.g., that the maneuver is predicted as unsafe and could lead to an accident). Navigation program 110 can then generate images of the predicted position and trajectory of the second vehicle in relation to the predicted position and trajectory of the first vehicle.

In step 312, navigation program 110 integrates the generated visual representation into a user display. In this embodiment, navigation program 110 integrates the generated visual representation into a user display by overlaying the generated visual representation into the user display. For example, navigation program 110 can generate a dual view in the user display. When selected, navigation program 110 can optionally split a user's display into two halves. The first half of the user display can display route guidance information along with corresponding position information. The second half of the user display can display the created images. Navigation program 110 can additional provide one or more display icons (e.g., icons that link to one or more crowdsourced databases, icons that change display modes, icons that the user interface display such that different images can be displayed), that, when selected can change what is shown in the dual view mode.

FIG. 4 is a flowchart 400 depicting operational steps for predicting a lane departure, in accordance with an embodiment of the present invent.

In step 402, navigation program 110 identifies positions of one or more vehicles from one or more received images. In this embodiment, navigation program 110 identifies positions from one or more received images by identifying heights of known objects (e.g., a user's mobile device such as client computing device 102 that is within the user's vehicle) and identifying an angle of tilt of the known object to an unknown object (e.g., another vehicle). Navigation program 110 can then derive the distance of the unknown object from the known object as described in greater detail with regard to FIG. 5. In this embodiment, navigation program 110 iteratively identifies positions by monitoring position information using received information. For example, navigation program 110 can monitor position information by accessing sensors on client computing device 102 (e.g., accelerometers, GPS modules, etc.).

In step 404, navigation program 110 calculates future positions of a vehicle. In this embodiment, navigation program 110 calculates future positions of a vehicle based on a comparison of movements to a stationary object in the received. For example, in this embodiment, navigation program 110 utilizes Generative Adversarial Networks (GAN) to predict car trajectory based on image information collected from one or more sensors. Navigation program 110 can utilize a generative score model (not shown) that generates images depicture future locations of a vehicle and a discriminative classifier module (also not shown) to validate the generated image based on the prediction.

Figure 5:
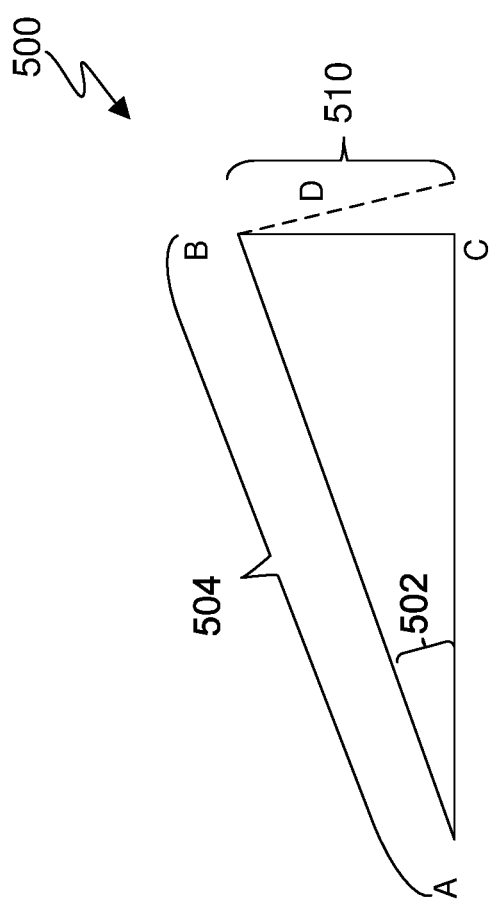
FIG. 5 is a visual representation of a distance calculation based on a mobile device angle, in accordance with an embodiment of the present invention.

FIG. 5 is a visual representation of a distance calculation based on a mobile device angle, in accordance with an embodiment of the present invention.

In this example, navigation program 110 calculates a distance of an object at point A to point B, represented by distance 504. A dotted line represents computing device D is tilted at point B. Navigation program 110 can estimate that computing device D is four feet from ground level (e., that distance between Points B and C is referred to as height 510). In other words, computing device D's position within a vehicle of a user is four feet from ground level. Navigation program 110 has further identified angle 502 to nine degrees that is, that computing device D is titled at a nine degree angle. Navigation program 110 can then use the known height (e.g., 4 feet) and the known computing device angle (nine degrees) to calculate the distance 504 to be 25.58 feet using Formula 1, listed below.

$$\sin x = \frac{\text{Height}}{\text{Distance}} \quad \text{Formula 1}$$

where, X is the angle the unknown object has in relation to the known object (e.g., angle 502 determined to be nine degrees), height refers to the height of a known object (e.g., computing device D, determined to be four feet), and distance refers to distance from the unknown object to the known object.

Figure 6:
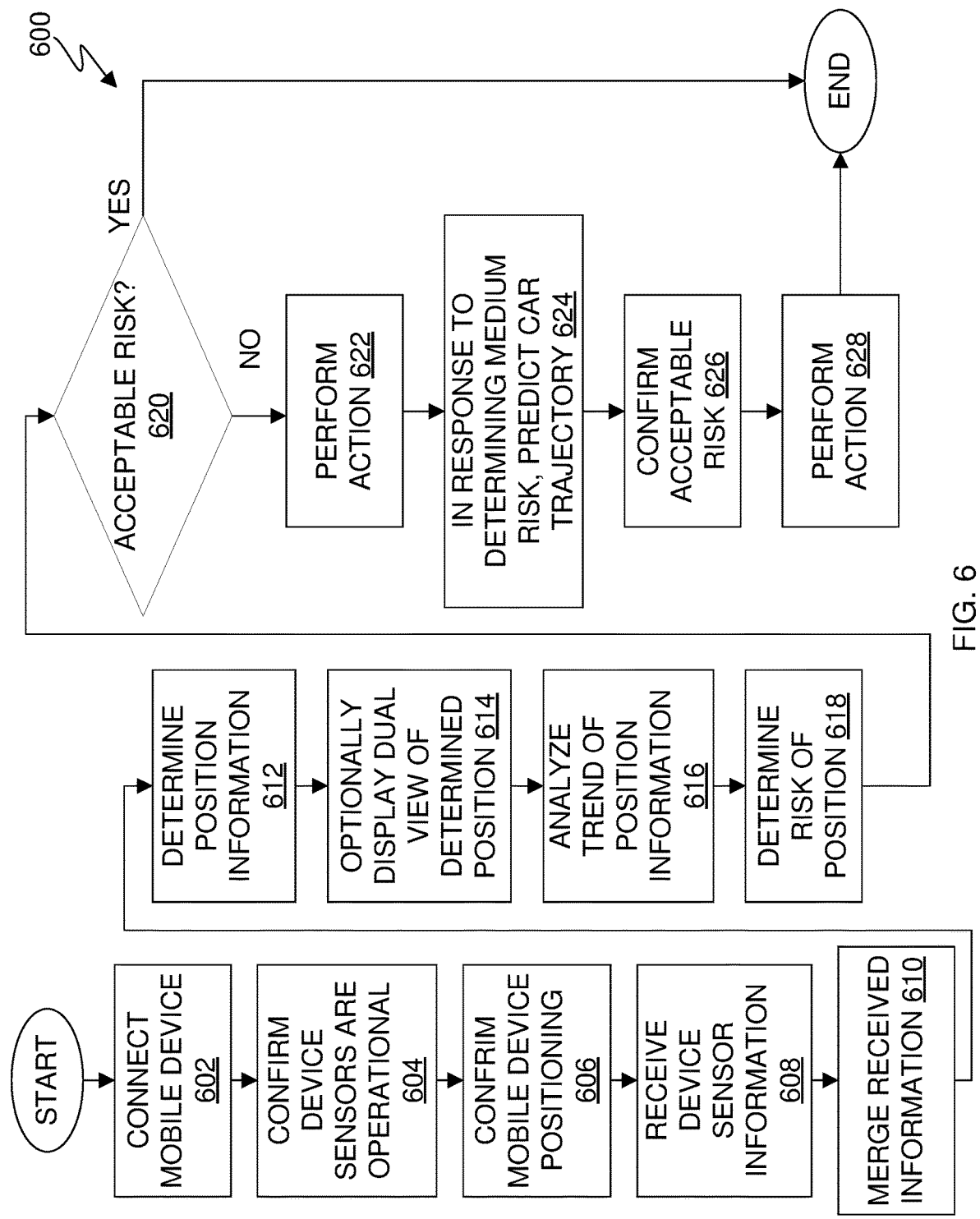
FIG. 6 is a flowchart depicting operational steps for an alternate method to predict a lane departure, in accordance with an embodiment of the present invention.

FIG. 6 is a flowchart 600 depicting operational steps for an alternate method to predict a lane departure, in accordance with an embodiment of the present invention.

In step 602, navigation program 110 connects with a mobile device. In this embodiment navigation program 110 transmits instructions to a user's mobile device (e.g., client computing device 102) to attach the mobile device and enable the program (e.g., navigation program 110). In other embodiments, navigation program 110 can function as a background application of the user's mobile device and may only transmit information in response to a user selecting the application. In other embodiments, navigation program 110 can automatically connect with a mobile device.

In this embodiment, navigation program 110 generates a dual display interface that displays route guidance and current position information (e.g., when using a navigation service) while also displaying one or more images generated by navigation program (e.g., visual representations of predicted movements as previously discussed). Navigation program 110 can statistically combine current traffic conditions with historic conditions and events, respectively to assess the risk of an event occurring at any given point on the route the user is currently taking.

The generated dual display interface can have one or more display icons that, when interacted with can show another layer and corresponding images. For example, navigation program 110 can use historic and current GPS location data feeds, overlaying the information at known, future GPS coordinate intervals on the map for distance ahead setting that is currently set at one mile ahead. Navigation program 110 can determine and display dual images, that is, both the GPS location provided image as well as the local image provided by one or more sensors (discussed below). Historic events can be overlaid in red and positioned in both displays relative to the GPS coordinates respectively in either display. In some embodiments, the generated dual display interface can link to permissioned, crowdsource databases.

In this embodiment, navigation program 110 comes preconfigured to have access to a vehicle's setup with fixture apparatus with current GPS. Navigation program 110 is also preconfigured to display in a user interface, display icons that enable "historic layers" and "lane departure layers". In this embodiment, navigation program 110 defaults to these display icons being enabled.

Navigation program 110 further shows a display icon that, when interacted with, can change a distance that is displayed in a dual display mode. The display icon can be a slider that can be controlled either manual (e.g., via touch screen) or via voice command. Distance increments can be change at preconfigured lengths (e.g., one mile at a time).

Navigation program 110 can then, in response to a user interaction with a display icon that activates a "Lane Departure Notification," enables data layer in a dual display mode. For example, when the vehicle approaches the edge of the lane, navigation program 110 can transmit any combination of audio and visual cues that serve as a warning notification until the user or the vehicle itself corrects positioning. In instances where the vehicle turn signal indicates the vehicle is changing lanes intentionally, navigation program 110 disables the lane departure notification.

In step 604, navigation program 110 confirms device sensors of the connected mobile device are operational. In this embodiment, navigation program 110 confirms that the device sensors of one or more connective mobile devices are operational (e.g., that cameras, GPS systems, Wi-Fi, Bluetooth®, vehicle cameras, etc.). In instances where navigation program 110 cannot confirm that a device sensor of the connected device sensors are not operational, navigation program 110 can transmit a notification to the user of the device sensor that is not operational or otherwise functioning.

In this embodiment, navigation program 110 transmits or otherwise obtains permission requests that allows navigation program 110 to access the device's position information, location services, as well as to anonymously upload weather data and traffic events to permissioned crowdsource location specific event stream. In these instances, navigation program 110 can provide configuration options for each crowdsourced data streams that have been approved by the user. Navigation program 110 can then activate a display icon (e.g., a toggle button) that enables that data layer in dual display. Navigation program 110 can display event information within the distance ahead setting.

In step 606, navigation program 110 confirms the position of the connected mobile device. In this embodiment, navigation program 110 confirms the position of the connected mobile device by transmitting a request to a user (via client computing device 102) to confirm that positioning of the connected mobile device is secure and in an optimal position. In this embodiment, navigation program 110 identifies that an optional position is a secure attachment of the mobile device to the vehicle's front view mirror. An actuator of a fastening device can dynamically adjust the angle of the mobile device. In instances, that navigation program 110 cannot confirm that the position of the connected mobile device, navigation program 110 can transmit a warning that includes adjustment suggestions for the user to make to the position of the connected mobile device.

In step 608, navigation program 110 receives mobile device sensor information. In this embodiment, navigation program 110 receives mobile device sensor information via network 106. Examples of device sensor information can include camera data from the mobile device. In other instances, navigation program 110 can further receive real time data from one or more edge services cloud data, cloud data weather information, and edge services cloud data traffic data which can included any number of crowd shared information.

In step 610, navigation program 110 merges received information. In this embodiment, navigation program 110 merges the received information by using a merger model that can be coupled with an artificial intelligence analytics engine.

In step 612, navigation program 110 determines position information of a vehicle. In this embodiment, navigation program 110 determines position information of the vehicle using proximity triangulation and approximation of a maximum standard deviation via statistical analysis based on the received, merged information.

In step 614, navigation program 110 optionally displays a dual view of the determined position. In this embodiment, navigation program 110 optionally displays a dual view of the determined position by creating a user interface display that splits the user's display into two halves, wherein the first half of the display displays route guidance, lane guidance, etc. and the second half displays created images as previously described with respect to step 310 of flowchart 300. Navigation program 110 then iteratively determines whether the vehicle is within a tolerable spectrum.

In step 616, navigation program 110 analyzes trends associated with the position information. In this embodiment, navigation program 110 analyzes trends associated with position information and how these trends will change in a time series. Navigation program 110 can combine received navigation information with real time crowdsourced information using a combination of predictive analytics, artificial intelligence algorithms, machine learning, and natural language processing.

In step 618, navigation program 110 determines risk of position and movement. In this embodiment, navigation program 110 determines risk of position and movement utilizing a risk prediction algorithm as previously described in step 308 of flowchart 300. In this embodiment, navigation program 110 can classify the determined risk as either low, medium and high. Each classification category (e.g., low, medium, and high) are determined by the risk confidence value assigned to the movement by navigation program 110.

A low risk is denotes a risk that has no impact to a low probability of an accident and is associated with a risk confidence value ranging from zero percent to thirty-three percent. In other words, navigation program 110 classifies a risk as "low" if it determines that the risk confidence value ranges from zero to thirty-three percent.

A medium risk denotes a risk that has a medium probability of an accident and is associated with a risk confidence value ranging from thirty-four percent to sixty-six percent. In other words, navigation program 110 classifies a risk as "medium" if it determines that the risk confidence value ranges from thirty-four percent to sixty-six percent.

A high risk denotes a risk that has a high probability of an accident and is associated with a risk confidence value ranging from sixty-seven percent to one hundred percent. In other words, navigation program 110 classifies a risk as "medium" if it determines that the risk confidence value ranges from sixty-seven percent to one hundred percent.

In step 620, navigation program 110 determines whether the determined risk is acceptable. In this embodiment, navigation program 110 determines that the risk is acceptable when it determines a risk to be "low". In this embodiment, navigation program 110 determines that a risk is not acceptable when it determines a risk to be "medium" or "high".

If, in step 620 navigation program 110 determines that the determined risk is acceptable, then, processing ends. While the flowchart depicts processing to end, navigation program 110, iteratively analyzes and determines position information, trends of position information and determine risks levels.

If, in step 620, navigation program 110 determines that the determined risk is not acceptable, then, in step 622, navigation program performs an action. In this embodiment, navigation program 110 performs an action based on a classification of whether the determined risk is a medium or low risk. In this embodiment, an action can include either issuing a warning for adjustment, suggesting actions a user can take, taking control of the vehicle, or predicting car trajectory.

In response to navigation program 110 determining that the risk associated with the move is "high", navigation program 110 can issue a warning for adjustment or suggest other actions (e.g., suggest lane changes, take control over the vehicle by applying brakes, accelerating, or otherwise maneuvering the vehicle to safety).

In step 624, in response to navigation program 110 determining medium risk, navigation program 110 predicts car trajectory. In this embodiment, navigation program 110 predicts car trajectory as described in FIGS. 3-5. Navigation program 110 can then generate visual representations of the predict car trajectory and show its image based on current conditions, texture. Navigation program 110 can then estimate road conditions ahead, check for accidents, traffic obstructions, as well as trajectory of the car. In this embodiment, navigation program 110 can continuously refine its predictions based on information received from one or more crowd sourced databases that include edge services as well as data from one or more other cars that are driving in the opposite direction of the vehicle.

In step 626, navigation program 110 confirms whether the risk associated with the predicted car trajectory is acceptable. In this embodiment, navigation program 110 confirms that the risk associated with the predicted car trajectory is acceptable based on the determined risk. Navigation program 110 can then transmit and otherwise share the predicted car trajectory with one or more other databases and/or vehicles that have been granted permission access.

In step 628, navigation program 110 performs an action. In this embodiment, navigation program 110 performs an action after confirming the acceptable risk. In this embodiment, an action can be transmitting and otherwise sharing the predicted car trajectory with one or more other databases and/or vehicles that have been granted permission access. An action can also refer to navigation program 110 iteratively monitoring and determining position information, car trajectory, and risk. An action can further include switching into a dual display mode that displays one or more created images (e.g., visual representations of maneuvers and risks associated with the maneuvers).

Figure 7:
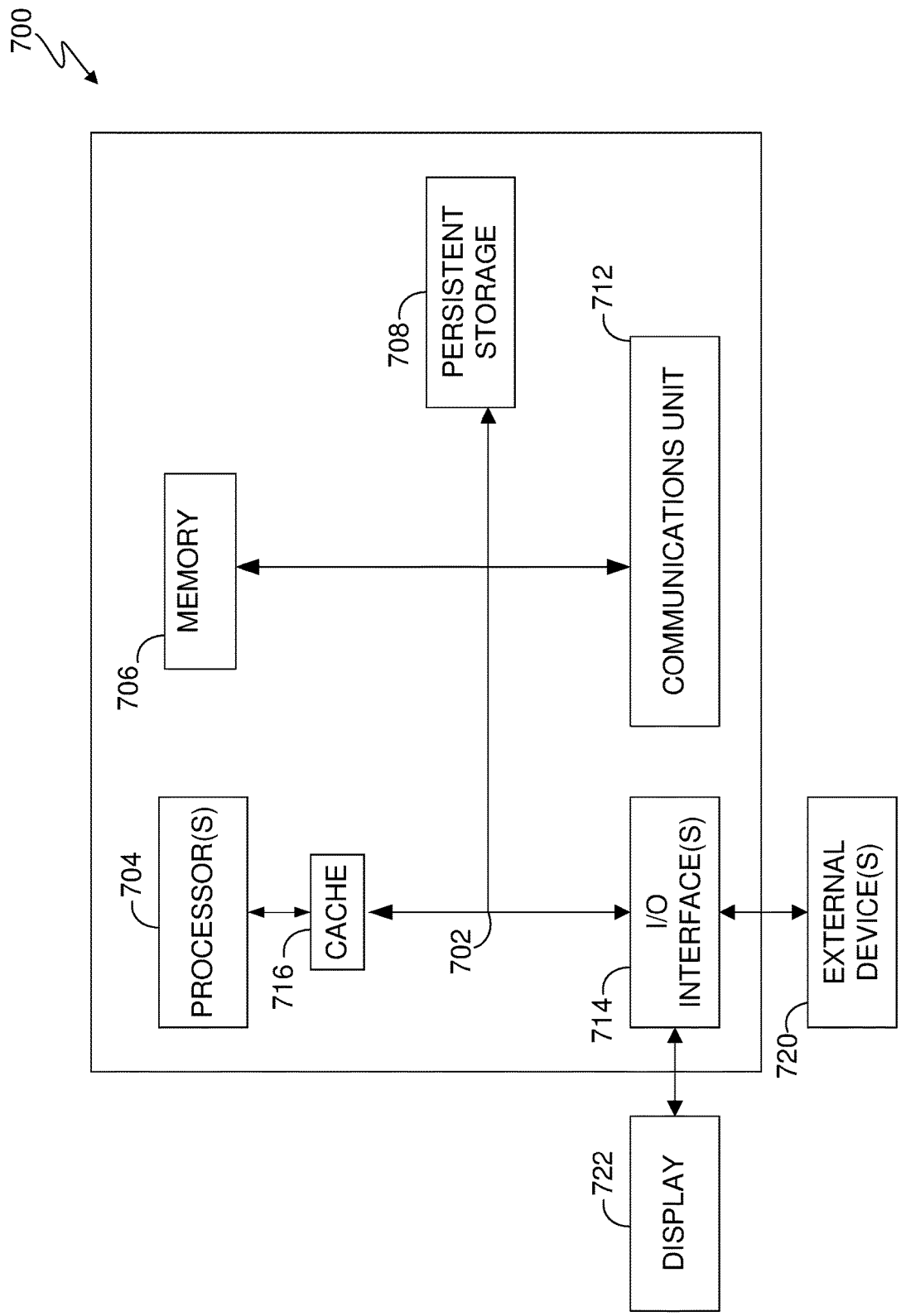
FIG. 7 depicts a block diagram of components of the computing systems of FIG. 1, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Navigation program 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Navigation program 110 may be downloaded to persistent storage 808 through communications unit 710.

I/O interface(s) 712 allows for input and output of data with other devices that may be connected to client computing device and/or server computer 108. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., navigation program 110, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   generating a risk score for one or more maneuvers associated with a predicted trajectory of a vehicle based on received position and location information;
   generating a visual representation for each of the one or more maneuvers that depicts a maneuver of the one or more maneuvers in relation to a current position of the vehicle, the risk score associated with respective maneuver prior to the vehicle performing the maneuver, and predicted trajectories of respective moving objects within a radius around the current position of the vehicle; and
   integrating the generated visual representation into a user display in a dual display mode that overlays one or more created images that are a representation of predicted locations of objects in relation to a future location of the vehicle overlaid on top of the user display.

2. The computer-implemented method of claim 1, further comprising:
   generating a user interface having one or more display icons, that, when interacted with, overlays one or more created images that can be overlaid on top of an existing navigation display.

3. The computer-implemented method of claim 2, wherein the generated user interface further comprises:
   a display icon that, when interacted with, activates a dual display mode that overlays one or more created images that are a representation of predicted locations of objects in relation to a future location of the vehicle that can be overlaid on top of an existing navigation display.

4. The computer-implemented method of claim 2, wherein the generated user interface further comprises:
   a display icon that, when interacted with activates a dual display mode that overlays one or more created images that are a representation of predicted weather along a route the vehicle currently taking at a pre-defined distance that can be overlaid on top of an existing navigation display.

5. The computer-implemented method of claim 2, wherein an interaction with a display icon of the one or more display icons triggers a recalculation of route guidance based on information received from one or more crowdsourced, permission databases.

6. The computer-implemented method of claim 1, wherein generating a visual representation for each of the one or more maneuvers associated with the predicted trajectory of the vehicle based on the generated risk score associated with each maneuver comprises:
calculating a distance between an unknown object and the vehicle based on positioning of device sensors;
predicting trajectory of the vehicle utilizing generative adversarial networks based on received position and location information; and
creating images of future locations of the vehicle based on the predicted trajectory.

7. The computer-implemented method of claim 1, further comprising:
in response to a generated risk score for a maneuver of the one or more maneuvers associated with a predicted trajectory of a vehicle reaching or exceeding a threshold value for risk, issuing a warning for adjustment of the vehicle.

8. A computer program product comprising:
one or more computer readable storage tangible device and program instructions stored on the one or more computer readable storage media, the program instructions comprising:
program instructions to generate a risk score for one or more maneuvers associated with a predicted trajectory of a vehicle based on received position and location information;
program instructions to generate a visual representation for each of the one or more that depicts a maneuver of the one or more maneuvers in relation to a current position of the vehicle, the risk score associated with respective maneuver prior to the vehicle performing the maneuver, and predicted trajectories of respective moving objects within a radius around the current position of the vehicle; and; and
program instructions to integrate the generated visual representation into a user display in a dual display mode that overlays one or more created images that are a representation of predicted locations of objects in relation to a future location of the vehicle overlaid on top of the user display.

9. The computer program product of claim 8, wherein the program instructions stored on the one or more computer readable storage media further comprise:
program instructions to generate a user interface having one or more display icons, that, when interacted with, overlays one or more created images that can be overlaid on top of an existing navigation display.

10. The computer program product of claim 9, wherein generated user interface further comprises:
a display icon that, when interacted with, activates a dual display mode that overlays one or more created images that are a representation of predicted locations of objects in relation to a future location of the vehicle that can be overlaid on top of an existing navigation display.

11. The computer program product of claim 9, wherein the generated user interface further comprises:
a display icon that, when interacted with activates a dual display mode that overlays one or more created images that are a representation of predicted weather along a route the vehicle currently taking at a pre-defined distance that can be overlaid on top of an existing navigation display.

12. The computer program product of claim 9, wherein an interaction with a display icon of the one or more display icons triggers a recalculation of route guidance based on information received from one or more crowdsourced, permission databases.

13. The computer program product of claim 8, wherein the program instructions to generate a visual representation for each of the one or more maneuvers associated with the predicted trajectory of the vehicle based on the generated risk score associated with each maneuver comprise:
program instructions to calculate a distance between an unknown object and the vehicle based on positioning of device sensors;
program instructions to predict trajectory of the vehicle utilizing generative adversarial networks based on received position and location information; and
program instructions to create images of future locations of the vehicle based on the predicted trajectory.

14. The computer program product of claim 8, wherein the program instructions stored on the one or more computer readable storage media further comprise:
program instructions to, in response to a generated risk score for a maneuver of the one or more maneuvers associated with a predicted trajectory of a vehicle reaching or exceeding a threshold value for risk, issue a warning for adjustment of the vehicle.

15. A computer system comprising:
one or more computer processors;
one or more computer readable storage media; and
program instructions stored on the one or more computer readable storage media for execution by at least one of the one or more computer processors, the program instructions comprising:
program instructions to generate a visual representation for each of the one or more that depicts a maneuver of the one or more maneuvers in relation to a current position of the vehicle, the risk score associated with respective maneuver prior to the vehicle performing the maneuver, and predicted trajectories of respective moving objects within a radius around the current position of the vehicle; and; and
program instructions to integrate the generated visual representation into a user display in a dual display mode that overlays one or more created images that are a representation of predicted locations of objects in relation to a future location of the vehicle overlaid on top of the user display.

16. The computer system of claim 15, wherein the program instructions stored on the one or more computer readable storage media further comprise:
program instructions to generate a user interface having one or more display icons, that, when interacted with, overlays one or more created images that can be overlaid on top of an existing navigation display.

17. The computer system of claim 16, wherein generated user interface further comprises:
a display icon that, when interacted with, activates a dual display mode that overlays one or more created images that are a representation of predicted locations of objects in relation to a future location of the vehicle that can be overlaid on top of an existing navigation display.

18. The computer system of claim 16, wherein the generated user interface further comprises:
a display icon that, when interacted with activates a dual display mode that overlays one or more created images that are a representation of predicted weather along a route the vehicle currently taking at a pre-defined distance that can be overlaid on top of an existing navigation display.

19. The computer system of claim 16, wherein an interaction with a display icon of the one or more display icons triggers a recalculation of route guidance based on information received from one or more crowdsourced, permission databases.

20. The computer system of claim 15, wherein the program instructions to generate a visual representation for each of the one or more maneuvers associated with the predicted trajectory of the vehicle based on the generated risk score associated with each maneuver comprise:
 program instructions to calculate a distance between an unknown object and the vehicle based on positioning of device sensors;
 program instructions to predict trajectory of the vehicle utilizing generative adversarial networks based on received position and location information; and
 program instructions to create images of future locations of the vehicle based on the predicted trajectory.

\* \* \* \* \*